United States Patent [19]

Geboers et al.

[11] 4,341,991

[45] Jul. 27, 1982

[54] VOLTAGE STABILIZER SUITABLE FOR A TELEPHONE SET

[75] Inventors: Josephus J. A. Geboers; Daniël J. G. Janssen; Johannes Bloos, all of Eindhoven, Netherlands

[73] Assignee: U.S. Philips Corporation, New York, N.Y.

[21] Appl. No.: 191,724

[22] Filed: Sep. 29, 1980

[30] Foreign Application Priority Data

Oct. 1, 1979 [NL] Netherlands .................... 7907275

[51] Int. Cl.³ ............................................. G05F 1/613
[52] U.S. Cl. .................................. 323/311; 179/16 F; 179/81 R; 323/225
[58] Field of Search ...................... 323/223–226, 323/303, 311, 312; 307/491, 542, 297, 567, 552; 179/16 F, 81 R

[56] References Cited

U.S. PATENT DOCUMENTS 3,174,095 3/1965 Cocker .............................. 323/311
3,973,082 8/1976 van der Plaats .................. 179/81 R
3,989,902 11/1976 Cowpland ........................ 179/16 F

*Primary Examiner*—William H. Beha, Jr.
*Attorney, Agent, or Firm*—Thomas A. Briody; William J. Streeter; Laurence A. Wright

[57] ABSTRACT

Voltage stabilizer for use in a telephone set which in order to obtain a low direct current resistance and a high alternating current impedance comprises two series-arranged transistor circuits connected between two terminals and a voltage divider connected between the terminals, the bases of the transistor circuits being connected to the terminals and the base of the upper transistor circuit of a capacitor being connected to the terminal to which the emitter of the lower transistor circuit has been coupled.

5 Claims, 4 Drawing Figures

VOLTAGE STABILIZER SUITABLE FOR A TELEPHONE SET

The invention relates to a voltage stabiliser which is suitable for a telephone set comprising a first and a second terminal, a first transistor circuit the main current path of which is coupled between the first and second terminals, a voltage divider arranged between the terminals, a first tapping point of the voltage divider being connected to the base of the transistor, and a capacitor being connected between the base of the transistor and the second terminal, the emitter of the transistor circuit is coupled to this second terminal.

BACKGROUND OF THE INVENTION

Such a stabiliser is known from Netherlands patent application No. 7307296. The desirable characteristics of a voltage stabiliser for use in a telephone set are: as low a direct current resistance as possible to keep the dissipation, particularly in the case of large line currents, at a minimum, a constant alternating current impedance which is high compared with the terminating impedance to avoid attenuation of the alternating current signals, such as speech and ringing signals, the alternating current impedance should in particular be independent of the consumed direct current, a low operating voltage to continue operation in the case of very long subscribers' lines is desired and a highest possible maximum line current to allow its use also in the case of very short subscribers' lines, without the maximum dissipation of the voltage stabiliser, which is preferably realized in integrated form, being exceeded.

In the stabiliser described in the above Netherlands Patent Application the alternating current impedance depends, however, to a very great extent on the direct current flowing through the stabiliser, owing to the so-called Early effect.

In addition, the stabiliser causes distortion of the alternating current signals, owing to the non-linear characteristics of the transistor circuit.

OBJECT OF THE INVENTION

It is an object of the invention to mitigate these drawbacks and to provide in a suitable manner a voltage stabiliser which has a low dissipation and a substantially constant and linear alternating current impedance of a sufficient value at a varying direct current through the stabiliser, and which satisfies the above-mentioned requirements to the highest possible extent.

SUMMARY OF THE INVENTION

According to the invention, the voltage stabiliser is characterized in that it comprises a resistor and a second transistor circuit the main current path of which is connected in series with the resistor between the main current path of the first transistor and the said second terminal and that the base of the second transistor is connected to a second tapping point on the voltage divider, this second tapping point being located on the part of the voltage divider between the first tapping point and the second terminal.

The stabiliser has the advantage that the second transistor in conjunction with the resistor forms the emitter load of the first transistor the smoothing action of the capacitor providing a substantially constant collector voltage for the second transistor by way of the base-emitter junction of the first transistor to establish a high and constant alternating current impedance, which also causes a considerable reduction of the non-linear distortion, so that a resistor of a lower value is sufficient in the emitter circuit of the second transistor. This provides an additional advantage, namely a low direct current impedance. It should be noted here that furthermore from German Offenlegungsschrift No. 2,158,564 it is known per se to arrange the main current path of a second transistor circuit in series with the main current path of the first transistor in order to obtain a high alternating current impedance. The main current path of the second transistor is, however, arranged between the first terminal and the main current path of the first transistor, so that for alternating voltage the capacitor does not short-circuit the base voltage of the second transistor and consequently an optimum alternating current impedance for the collector of the first transistor is not obtained. In addition, adjusting voltage is applied to the base of the second transistor circuit via a separate voltage divider comprising a zener diode. This does not only require an additional voltage divider but has more specifically the disadvantage that the voltage of the first terminal must not decrease to below the zener diode voltage during the negative peaks of a speech signal produced between the terminals. In the voltage stabiliser embodying the invention, the voltage at the collector of the first transistor may be approximately one diode voltage lower than the base voltage of the transistor before the proper operation of the circuit is affected. At the low operating voltage of this stabiliser of approximately 2 Volts this allows the circuit to be driven by an approximately 25% higher voltage swing.

The magnitude of the voltage produced by the zener diode is determined by the operation of the stabiliser at the highest line current. The high zener diode voltage determined thereby has the disadvantage that in the case of long subscribers' lines this indispensible operating voltage is absent, which considerably reduces the range of application of this stabiliser.

Netherlands patent application No. 7212510 discloses a signal generating device the output circuit of which is constructed as a stabilisation circuit, the emitter circuit of the first transistor comprising a resistor. However, this resistor is used to obtain a line terminating impedance of 300 Ohm. This causes the non-linear distortion to be reduced but has the drawback that a considerable extra dissipation occurs in this resistor and it causes the value of the voltage across the circuit to depend to a great extent on the current flowing through the stabiliser.

As the second tapping point is located between the first tapping point and the second terminal, which is necessary to obtain a bias voltage for the base-emitter junction of the first transistor circuit, a noise source in the form of the resistor is introduced between the smoothing capacitor and the base and the second transistor, the noise produced by the resistor being applied to the terminals with a gain factor determined by the ratio between the resistances of the potentiometer.

To eliminate this noise source, in a further embodiment the second tapping point to which the basis of the second transistor circuit is connected coincides with the first tapping point and the emitter surface area of the first transistor is made larger than the emitter surface area of the second transistor circuit.

BRIEF DESCRIPTION OF THE DRAWINGS

Embodiments of the invention and its advantages will be further explained by way of example with reference to the accompanying drawings in which corresponding components having been given the same reference numerals, and in which.

DETAILED DESCRIPTION OF THE PREFERRED EMBODIMENTS

Figure 1:
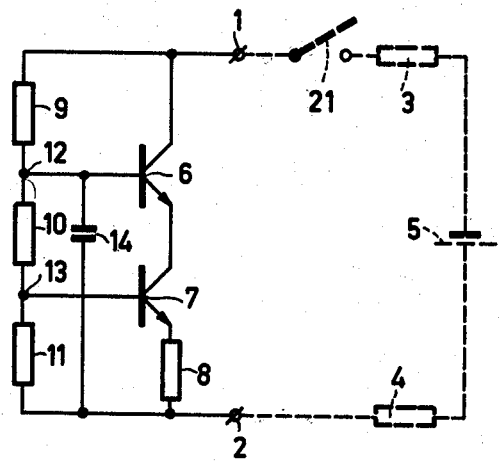
FIG. 1 shows a first embodiment of a voltage stabiliser according to the invention.

The voltage stabiliser shown in FIG. 1 has a first terminal 1 and a second terminal 2 by means of which this stabiliser is connected to an exchange, shown in the form of battery 5, by way of a hook contact 21 and a subscriber's line which is represented by the resistors 3 and 4 (shown by means of broken lines).

Furthermore, connected to the terminals 1 and 2 there is a circuit, not shown, of a telephone set which requires a stabilised supply voltage.

The stabiliser comprises, a series arrangement of the main current paths of two transistors 6 and 7 and a resistor 8 and a voltage divider arranged in parallel therewith, which, in this embodiment, comprises the series arrangement of the resistors 9, 10 and 11 connected between the terminals 1 and 2. The bases of the transistors 6 and 7 are connected to first and second tapping points 12 and 13, repectively, of the voltage divider. The base of the first transistor is further connected to the second terminal 2 via a capacitor 14 which is selected to have a low impedance to the alternating speech and signalling signals.

The circuit operates as follows: On closure of the hook contact the voltage between the terminals 1 and 2 increases from zero Volt. As soon as the voltage at the second tapping 13 point exceeds the base-emitter voltage of the second transistor 7, being 0.6 Volt, in response to the current flowing in the voltage divider, the second transistor 7 is rendered conductive. The first transistor 6 is rendered conducitve simultaneously with the second transistor 7 as the value of resistor 10 has been chosen such that at the said current the voltage at the first tapping point 12 exceeds the voltage at the second tapping point 13 by an amount which is at least equal to the collector-emitter voltage of the second transistor 7.

The voltage between the terminals 1 and 2 is equal to the ratio between the resistors 9, 10 and 11, and the resistor 11, multiplied by the base-emitter voltage of the second transistor 7.

When the voltage between the terminals increases at a rate which is slower than the time constant determined by the values of the resistor 9, the series arrangement of the resistors 10 and 11 and the capacitor 14 connected in parallel therewith, the capacitor 14 will be charged further and the voltage at the bases of the first and second transistors 6 and 7 increases in proportion to the voltage across the stabiliser, causing the stabiliser to carry a larger current. This larger current which is supplied by the voltage source 5, causes a larger voltage drop across the resistors 3 and 4, which opposes the increase of the voltage between the terminals 1 and 2. The reverse holds for a slow decrease of the voltage between the terminals 1 and 2.

For a certain bias current of the transistors 6 and 7, the direct voltage across the stabiliser remains substantially constant, neglecting the voltage increase caused by the resistor 8. For a change in the voltage between the terminals which is faster than the said charging time constant such as for speech and multi-frequency dialling tone signals, the capacitor forms almost a short-circuit, so that the said voltage range is not applied to the bases of the transistors 6 and 7. The alternating current impedance of the stabiliser is therefore determined by the value of the resistor 9 and the impedance seen in the collector of the first transistor 6.

Figure 2:
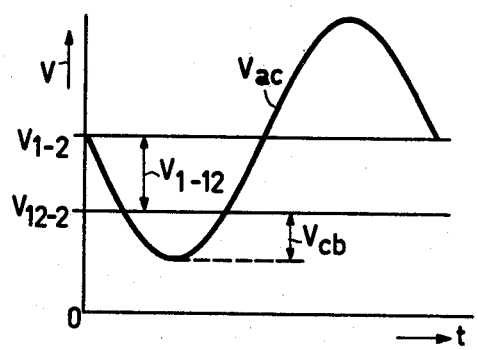
FIG. 2 shows a graph in which some voltages occuring in the embodiment shown in FIG. 1 have been plotted versus the time.

In FIG. 2, the lowest direct voltage $V_{1-2}$ which may be present between the terminals 1 and 2, the direct voltage $V_{12-2}$ of the base of transistor 6 then produced and the maximum permissible alternating voltage $V_{ac}$ between the terminals 1 and 2 are plotted versus the time. As can be seen from this graph, the alternating voltage which is superimposed on the direct voltage $V_{1-2}$ may have a value which is equal to the voltage $V_{1-12}$ across resistor 9, increased by the junction voltage $V_{CB}$ across the collector-base junction of transistor 6, before this junction will be rendered conductive. In a practical embodiment of this stabiliser it has been found that the use of the collector-base junction voltage as an extra drive region renders an increase of approximately 25% in the drive voltage of the transistor possible, compared with the case this extra drive margin were not used.

The collector impedance of transistor 7 is inter alia determined by the value of the impedance in the emitter circuit of the first transistor 6, which is high because of the fact that the second transistor 7 is arranged in cascade with the first transistor 6.

The magnitude of the collector impedance depends on the presence of resistor 8, as, in response to voltage excursions of the collector voltage of transistor 7 across this resistor, currents through this resistor produce voltage changes which are in phase with those of the collector.

As a result the voltage excursion of the collector-emitter voltage of the second transistor 7 is smaller than the voltage excursion of the collector of the second transistor with respect to the second terminal 2, which means a larger alternating current impedance of the collector than for the case where resistor 8 is absent.

However, the resistor 8 has a further important function of increasing the linearity of the circuit for alternating current by reducing the influence of the non-linear behaviour of the base-emitter diode of the second transistor 7 on the base current.

The most significant reason for the increase in the alternating current impedance of the stabiliser is, however, the fact that the collector voltage of the second transistor 7 for alternating voltages is determined by the base voltage and the base-emitter voltage of the first transistor 6. Owing to the fact that capacitor 14 holds the base voltage of the first transistor constant at the direct voltage value determined by the voltage divider by short-circuiting the alternating voltage and that the base-emitter voltage of a transistor varies only little in response to large collector voltage changes, the collector voltage of the second transistor 7 is substantially constant, which results in a high alternating voltage impedance.

In addition, it is a property of a transistor that large collector current changes can be obtained at relatively small changes in the base-emitter bias voltage. This means that the collector voltage of the second transistor 7 need change only little for a wide direct current control range of the voltage stabiliser, which also results in a substantially constant alternating voltage impedance.

Because of these properties of the circuit, the value of the resistor 8 may be low, as it now namely serves to produce the linear character of the impedance. It was found that in practice a resistance of 5 to 6 Ohm is sufficient.

This low value of the resistor 8 has the advantage that the increase in the voltage across the stabiliser remains small with increasing current, causing a smaller increase in the extra dissipation with increasing current than would be the case were the second transistor not present.

This low dissipation has the advantage that the stabiliser can take up a higher maximum current when the maximum permissible dissipation is known, as is the case when the stabiliser is implemented in integrated form.

The properties of the stabiliser can be further improved by using transistor circuits having a higher gain factor instead of single transistors.

Figure 3:
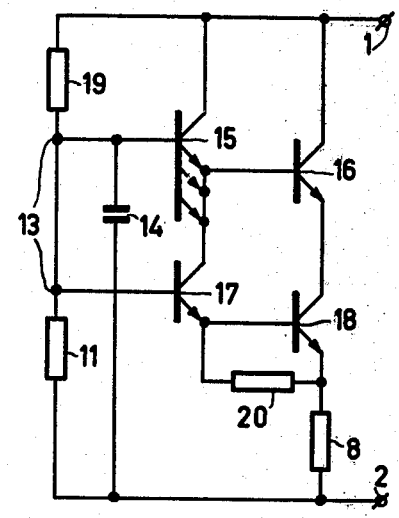
FIG. 3 shows a second embodiment of a voltage stabiliser according to the invention.

FIG. 3 shows an embodiment in which Darlington transistors 15, 16 and 17, 18 are substituted for the transistor circuits.

The embodiment shown in FIG. 1 is sensitive to noise and disturbing signals at the tapping point 13 of the voltage divider. For example, the noise generated in the resistors 10 and 11 is amplified by transistor 7 and applied to the terminals 1 and 2 via transistor 6.

This drawback has been obviated in the embodiment shown in FIG. 3. The voltage divider comprises only two resistors 19 and 11 and the bases of the first transistors 15 and 17 of the Darlington pair are both connected to the same tapping point 13 of the voltage divider. This has the advantage that the resistor 10 is no longer required and that the noise and the disturbing signals at tapping poing 13 are short-circuited by the capacitor 14, so that these signals cannot be amplified by the Darlington transistors.

However, in order to create a sufficiently high collector-emitter voltage for the first transistor 17 of the second Darlington pair 17, 18 the emitter surface area of the first transistor 15 of the first Darlington pair is made approximately five to six times larger than the emitter surface area of the first transistor 17 of the second Darlington pair.

The current through the first transistor 17 of the second Darlington pair is provided by the base current of the second transistor 18. This causes a voltage change of 120 mV per decade of current variation which, for values of currents below 6 mA through the stabiliser results in too high a differential resistance.

To mitigate this a resistor 20 having a value of approximately 10 K Ohm is included between the base and the emitter of the second transistor 18. This causes the current through the first transistor 17 to be formed by the base current of the second transistor 18 and the current through the resistor 20.

When the current through the stabiliser is decreased to a value less than 6 mA, the base current of the second transistor 18 decreases to a value which is lower than the current through the resistor 20, causing the first transistor 17 to carry a substantially constant current and the voltage variation of 120 mV per decade to decrease to 60 mV per decade of current variation.

Consequently, the value of the differential resistance for small currents has decreased, so that the stabiliser circuit of this embodiment can be used to approximately 0.6 mA.

Figure 4:
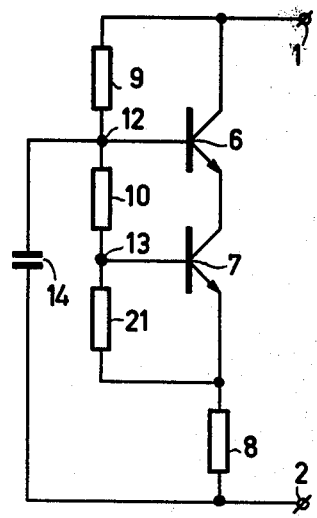
FIG. 4 shows a third embodiment of a voltage stabiliser according to the invention.

An increase in the permissible maximum line current produced in the case of very short subscriber's lines is obtained by means of the embodiment shown in FIG. 4. This embodiment differs from the embodiment of FIG. 1 in that the resistor 8 forms part of the voltage divider. To that end, the resistor 11 of FIG. 1 is replaced by resistors 21 and 8, as resistor 21 is connected between the tapping point 13 and the emitter of resistor 7.

This accomplishes that a voltage across the resistor 8 does not occur in the direct voltage $V_{1-2}$ across the stabiliser as a factor one, increased by the ratio between the resistors of the voltage divider, as is the case in the embodiment shown in FIG. 1, but that this voltage occurs in this direct voltage $V_{1-2}$ only as a factor one. This reduction in the operating voltage across the voltage stabiliser permits a larger line current for a given maximum dissipation, such as it occurs, for example, when the stabiliser is realized in integrated circuit form. This means that this measure extends the range of application of this voltage divider to still shorter subscriber's lines.

It will be obvious that this measure is equally suitable for use in the embodiment shown in FIG. 3.

What is claimed is:

1. A voltage stabiliser which is suitable for a telephone set comprising a first and second terminal, a first transistor the main current path of which is coupled to the terminals, a voltage divider arranged between the terminals, a first tapping poing of the voltage divider being connected to the base of the transistor, and a capacitor connected between the base of the transistor and a second terminal, the emitter of the first transistor circuit is coupled to this second terminal, characterized in that the stabiliser comprises a resistor and a second transistor circuit the main current path of which is connected in series with the resistor between the main current path of the first transistor and the second terminal and that the base of the second transistor is connected to a second tapping point on the voltage divider, this second tapping point being located on the part of the voltage divider lying between the first tapping point and the second terminal.

2. A voltage stabiliser as claimed in claim 1, characterized in that the second tapping point coincides with the first tapping point and that the emitter surface area of the first transistor is larger than the emitter surface area of the second transistor.

3. A voltage stabiliser as claimed in claim 1, characterized in that the first and second transistor comprise two pairs of transistors whose collectors are interconnected and the emitter of the first transistor of the pairs is connected to the base of the second transistor of the pairs and the collector-emitter path of the second transistor of each pair constitutes the main current path of the transistor.

4. A voltage stabiliser as claimed in claim 3, characterized in that a resistor is connected between the base and the emitter of the second transistor of the second transistor pair.

5. A voltage stabiliser as claimed in claim 1, characterized in that the said resistor forms part of the voltage divider.

* * * * *